United States Patent
Boutin et al.

(10) Patent No.: US 9,442,760 B2
(45) Date of Patent: Sep. 13, 2016

(54) JOB SCHEDULING USING EXPECTED SERVER PERFORMANCE INFORMATION

(71) Applicant: Microsoft Technology Licensing, LLC, Redmond, WA (US)

(72) Inventors: Eric Boutin, Renton, WA (US); Jaliya Ekanayake, Redmond, WA (US); Wei Lin, Issaquah, WA (US); Bin Shi, Issaquah, WA (US); Jingren Zhou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 14/506,482

(22) Filed: Oct. 3, 2014

(65) Prior Publication Data

US 2016/0098292 A1    Apr. 7, 2016

(51) Int. Cl.
*G06F 9/48* (2006.01)
*G06F 9/50* (2006.01)

(52) U.S. Cl.
CPC .............. *G06F 9/4881* (2013.01); *G06F 9/505* (2013.01); *G06F 9/5066* (2013.01); *G06F 9/4806* (2013.01); *G06F 9/5016* (2013.01); *G06F 9/5027* (2013.01); *G06F 9/5038* (2013.01); *G06F 2209/501* (2013.01); *G06F 2209/505* (2013.01); *G06F 2209/5017* (2013.01)

(58) Field of Classification Search
None
See application file for complete search history.

(56) References Cited

U.S. PATENT DOCUMENTS

| 5,504,894 A * | 4/1996 | Ferguson | G06F 9/5083 |
| 8,347,302 B1 * | 1/2013 | Vincent | G06F 9/4881 718/103 |
| 8,566,897 B2 * | 10/2013 | Sequeira | G06F 9/4881 725/145 |

(Continued)

FOREIGN PATENT DOCUMENTS

EP    1887498 A1    2/2008

OTHER PUBLICATIONS

Smith, W., et al., Using Run-Time Predictions to Estimate Queue Wait Times and Improve Scheduler Performance, Lecture Notes in Computer Science, Jul. 2000, pp. 202-210, [retrieved on Jun. 22, 2016], Retrieved from the Internet: <URL:http://link.springer.com/chapter/10.1007/3-540-47954-6_11>.*

(Continued)

*Primary Examiner* — Thuy Dao
*Assistant Examiner* — Geoffrey St Leger
(74) *Attorney, Agent, or Firm* — Nicholas Chen; Doug Barker; Micky Minhas

(57) ABSTRACT

A job scheduler that schedules ready tasks amongst a cluster of servers. Each job might be managed by one scheduler. In that case, there are multiple job schedulers which conduct scheduling for different jobs concurrently. To identify a suitable server for a given task, the job scheduler uses expected server performance information received from multiple servers. For instance, the server performance information might include expected performance parameters for tasks of particular categories if assigned to the server. The job management component then identifies a particular task category for a given task, determines which of the servers can perform the task by a suitable estimated completion time, and then assigns based on the estimated completion time. The job management component also uses cluster-level information in order to determine which server to assign a task to.

36 Claims, 11 Drawing Sheets

(56) References Cited

U.S. PATENT DOCUMENTS

| | | | | |
|---|---|---|---|---|
| 8,607,246 B2* | 12/2013 | Al-Kadi | ................ | G06F 9/4881 718/106 |
| 8,612,984 B2* | 12/2013 | Bell, Jr. | ................ | G06F 9/5094 713/320 |
| 8,943,353 B2* | 1/2015 | Piet | ........................ | G06F 11/16 714/2 |
| 9,152,467 B2* | 10/2015 | Cadambi | ................ | G06F 9/5044 |
| 9,244,740 B2* | 1/2016 | Akimoto | ................. | G06F 9/505 |
| 2006/0106931 A1* | 5/2006 | Richoux | ............... | G06F 9/5066 709/226 |
| 2007/0245053 A1* | 10/2007 | Ellis | ...................... | G06F 9/4806 710/260 |
| 2008/0052712 A1* | 2/2008 | Gustafson | ............... | G06F 9/505 718/101 |
| 2008/0263561 A1* | 10/2008 | Tagashira | .............. | G06F 9/5016 718/104 |
| 2010/0275212 A1* | 10/2010 | Saha | ..................... | G06F 9/5027 718/104 |
| 2011/0107345 A1* | 5/2011 | Al-Kadi | ................ | G06F 9/4881 718/106 |
| 2011/0231888 A1* | 9/2011 | Sequeira | ................ | G06F 9/4881 725/116 |
| 2011/0271283 A1* | 11/2011 | Bell, Jr. | ................ | G06F 9/5094 718/102 |
| 2012/0198462 A1* | 8/2012 | Cham | ................... | G06F 9/5038 718/103 |
| 2013/0047164 A1* | 2/2013 | Ujibashi | ............... | G06F 9/4881 718/104 |
| 2013/0298134 A1* | 11/2013 | Jackson | .................. | G06F 9/505 718/104 |
| 2014/0208327 A1* | 7/2014 | Cadambi | ............... | G06F 9/5044 718/103 |
| 2014/0215481 A1* | 7/2014 | Piet | ......................... | G06F 9/505 718/104 |
| 2014/0250287 A1* | 9/2014 | Akimoto | ................. | G06F 9/505 712/31 |
| 2015/0067688 A1* | 3/2015 | Nagasawa | ............. | G06F 9/4881 718/102 |

OTHER PUBLICATIONS

Zhu, Y., et al., A Survey on Grid Scheduling Systems, Technical Report SJTU_CS_TR_200309001, Department of Computer Science and Engineering, Shanghai Jiao Tong University, 2013, 42 pages, [retrieved on Jun. 22, 2016], Retrieved from the Internet: <URL:http://www.cs.sjtu.edu.cn/~yzhu/reports/SJTU_CS_TR_200309001.pdf>.*

"International Search Report & Written Opinion Issued in PCT Application No. PCt/US2015/053145", Mailed Date: Dec. 15, 2015, 11 pages.

International Preliminary Report on Patentability Issued in PCT Application No. PCT/US2015/053145, Mailed Date: May 30, 2016, 7 Pages.

* cited by examiner

300

Memory →

Processing ↓

| | 4GB | 8GB | 12GB | 16GB |
|---|---|---|---|---|
| 2 core | 0s | 10s | 10s | 16s |
| 4 core | 0s | 10s | 10s | 16s |
| 6 core | 5s | 10s | 10s | 16s |
| 8 core | 10s | 15s | 15s | 25s |

| Server | Wait | I/O | Wait + I/O |
|---|---|---|---|
| A | 0s | 63.13s | 63.13s |
| B | 0s | 63.5s | 63.5s |
| C | 40s | 32.50s | 72.50s |
| D | 5s | 51.25s | 56.25s |

JOB SCHEDULING USING EXPECTED SERVER PERFORMANCE INFORMATION

BACKGROUND

Computing systems are ever more capable of highly efficient processing of computation jobs. Computational jobs often include many tasks, with various dependencies, and some capable of being performed in parallel. A task is a basic unit of execution that can be scheduled to be performed, and thus ultimately performed, on a server. Conventional server clusters can often handle thousands of task requests per second. The tasks are diverse in nature, with a variety of characteristics in terms of data volume to process, complexity of computation logic, degree of parallelism, and resource requirements.

Often, an entire cluster of servers is available and shared for performing a large number of computational jobs. As tasks are ready for execution given the current state of the computational job, the task is assigned to one of the servers for execution. Task by task, the job progresses with the aim of completion of the job, and with different servers contributing to completion of the job. Conventional scheduling technologies have been developed in order to track task dependencies, job progress, and identify suitable servers for executing tasks as the task becomes ready for execution.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a job scheduler that causes a computational job to be scheduled by assigning the various tasks of the computational job each to suitable servers within a cluster of servers. A job management component identifies a computational job to perform, identifies the tasks associated with that job as well as associated dependencies, determines which tasks are presently ready to be performed based on the dependencies, and causes each ready task to be scheduled on a corresponding server appropriate for that task. Accordingly, for each task that is ready for scheduling, the job management component selects a server from amongst the available servers, whereupon the task is then scheduled on the selected server. Multiple jobs may thus run concurrently over the same cluster. In accordance with some embodiments described herein, each of the jobs may be controlled by a dedicated job management component.

In order to identify a suitable server for a given task, the job management component uses expected server performance information received from multiple servers. For instance, the server performance information might include expected performance parameters for tasks of particular categories if assigned to the server. The job management component then identifies a particular task category for a given task, determines which of the servers can perform the task by a suitable estimated completion time, and then assigns the task based on the estimated completion time. The job management component also uses cluster-level information in order to determine which server to assign a task to. The job management component then submits a request to perform the task to the selected server.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
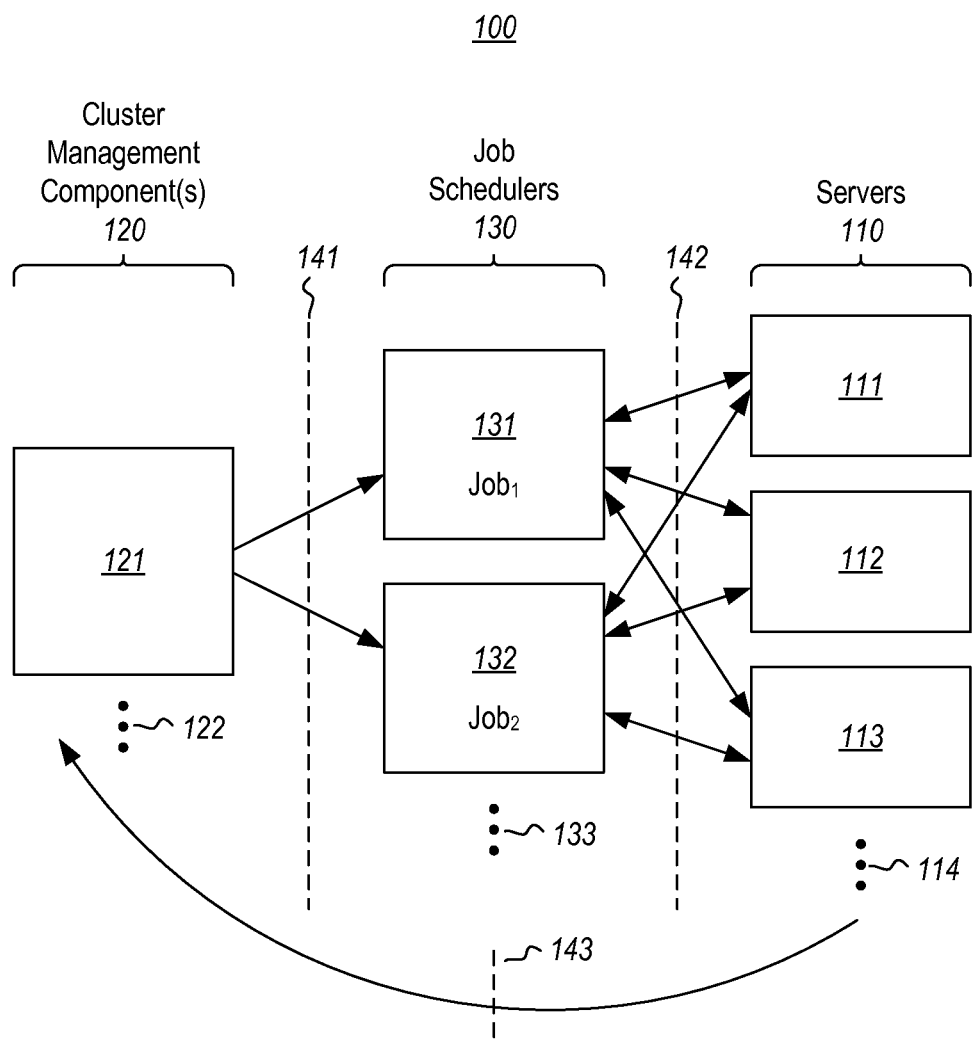
FIG. 1 illustrates a job scheduling framework that includes a cluster system.

At least some embodiments described herein relate to a job scheduler infrastructure that causes a job to be scheduled by assigning the various tasks of the computational job each to suitable servers within a cluster of servers. A job management component identifies a computational job to perform, identifies the tasks associated with that job as well as associated dependencies, determines which tasks are presently ready to be performed based on the dependencies, and causes each ready task to be scheduled on a corresponding server appropriate for that task. Accordingly, for each task that is ready for scheduling, the job management component selects a server from amongst the available servers, whereupon the task is then scheduled on the selected server.

In order to identify a suitable server for a given task, the job management component uses expected server performance information received from multiple servers. For instance, the server performance information might include expected performance parameters for tasks of particular categories if assigned to the server. As an example, the server performance information might include expected wait times before the tasks of various categories are anticipated to begin execution given the current server state. The job management component then identifies a particular task category for a given task, determines which of the servers can perform the task by a suitable estimated completion time, and then assigns the task based on the estimated completion time. The job management component also uses cluster-level information in order to determine which server to assign a task to. The job management component then submits a request to perform the task to the selected server.

Although the subject matter has been and will be described in language specific to structural features and/or methodological acts, it is to be understood that the subject matter defined in the appended claims is not necessarily limited to the described features or acts described above, or the order of the acts described herein. Rather, the described features and acts are disclosed as example forms of implementing the claims.

Conventionally, data-processing computations (also referred to herein as "computational jobs" or simply "jobs") may process terabytes of data on large clusters of hardware (e.g., servers and storage). Often, such computational jobs can have high degrees of parallelism. Each computational job consists of a number of tasks with inter-task dependencies that describe execution order. A "task" is a term of art that represents is a basic unit of computation.

A job scheduler tracks task dependencies and assigns tasks to servers when those tasks become ready to execute given the current state of the job flow. For instance, a task is ready to execute when the current state of the job flow shows that all task dependencies for the task are completed. The assigned server may then execute a given task once that server is ready. In highly parallel portions of the job flow, there might be enumerable tasks that are ready to execute, and that await job scheduling.

In a typical cluster, there might be tens of thousands of servers or more, with thousands of users submitting job requests to the cluster for scheduling each day. The submitted jobs are diverse in nature, with a variety of characteristics in terms of data volume to process, complexity of computation logic, degree of parallelism, and resource requirements. Conventional clusters often field many thousands of task scheduling requests per second.

In accordance with the principles described herein, a job scheduling framework is described that allows for scaling to large cluster systems using a loosely coupled communication framework between servers (i.e., processing nodes that perform the task), job schedulers (that schedule the task) and cluster management components. Embodiments of the job scheduling framework scale to make many thousands or millions or more scheduling decisions per second on clusters having many thousands or millions or more servers. Furthermore, embodiments of the job scheduling framework maintain balanced sharing of resources among different users and groups. Also, embodiments of the job scheduling framework makes high-quality and complex scheduling decisions that take into account factors such as data locality, job characteristics, and/or server load, to minimize job latencies while utilizing the resources in a cluster fully.

FIG. 1 illustrates a job scheduling framework that includes a cluster system 100. The cluster system 100 includes multiple servers 110. For instance, in the illustrated cluster system 100, there are three servers 111, 112 and 113. However, this is for purposes of simplicity and clarity. The ellipses 114 represent that the cluster system 100 may include any number of servers, from as few as two and with no upper limit. For instance, there may be thousands or even millions (or more) of servers within the cluster system 100. In fact, one of the benefits of the job scheduling framework is its ability to scale to cluster systems having very large numbers of servers.

The cluster system 100 also includes a cluster management component(s) 120 configured to maintain cluster-level information. Although the cluster management component(s) 120 shows just one cluster management component 121, the ellipses 122 represents that there may indeed be more than one cluster management component within the cluster system 100. The cluster management component(s) 120 is/are responsible for maintaining cluster level information about the cluster system. That cluster-level information may depend on the state of the cluster system 100 and thus may change dynamically over time.

The job scheduling itself is accomplished by the job schedulers 130. In one embodiment, a job scheduler is responsible for scheduling only one job at a time. For instance, in the illustrated cluster system, the job schedulers 130 includes a first job scheduler 131 that is responsible for scheduling tasks associated with a first job ($Job_1$), and a second job scheduler 132 that is responsible for scheduling tasks associated with a second job ($Job_2$).

The ellipses 133 represent flexibility in the number of jobs being actively performed by the cluster system 100. Although only two jobs are illustrated as being scheduled in the cluster system 100 for simplicity and clarity, the number of jobs in process within a given cluster system will vary over time as jobs complete, initiate, abort, and so forth, and may include a very large number of jobs. The high scalability within the job scheduling infrastructure might be at least partially achieved by simplifying the work of the job scheduler so that a given instance of the job scheduler only has to handle job scheduling for but a single job at a time. Accordingly, the job scheduler need not have any logic that would be required to track and manage a variable number of multiple jobs.

The cluster system 100 also includes a number of interfaces 141, 142 and 143 through which the servers 110, the cluster management component(s) 120, and the job schedulers 130 may communicate. The interfaces 141, 142 and 143 may be application program interfaces (APIs) or any other interface through which computing entities may communicate. For instance, the cluster management component(s) 120 may communicate to the job schedulers using interface 141. The job schedulers 130 and the servers 110 may communicate using the interface 142. The servers 110 may communicate to the cluster management component 120 using the interface 143.

Although the communication between the cluster management component(s) 120 and the job schedulers 130 is shown as being one-way, the principles described herein also contemplate bi-directional communication through the interface 141. Furthermore, although the communication between the cluster management component(s) 120 and the servers 110 is shown as being one-way, the principles described herein also contemplate bi-directional communication through the interface 143. Additionally, as the term "interface" is to be interpreted broadly herein, a single interface having multiple methods may be considered to be multiple interfaces, and multiple interfaces may be considered to be a single interface.

Each job scheduler 130 makes intelligent decisions about the scheduling of each associated task by using information provided by each of the servers 110 regarding the capability of the server to handle tasks of particular categories. Such server-level information may be communicated from the servers 110 to the job schedulers 130 directly using the interface 142 and/or indirectly via the cluster management component(s) 120 using the interface 141. In addition, each job scheduler 130 may use cluster-level information provided by the cluster management component(s) 120 to make decisions regarding task assignment. Thus, each job scheduler 130 may consider both the present state of each server 110 as well as cluster-level information in order to make an information-based decision regarding which server 110 to assign a task to.

The number of job schedulers 130 may adjust upwards or downwards depending on the number of jobs being managed without changing the interface 141, and without changing the interface 142, and regardless of the number of servers 110 or the number of cluster management component(s) 120. Furthermore, the number of servers 110 does not affect the interfaces 142 and 143. Likewise, the number of cluster management component(s) 120 does not affect the interfaces 141 and 143. Accordingly, the cluster system 100 has a loose coupling between the servers 110, the cluster management component(s) 120, and the job schedulers 130, allowing the scheduling framework to easily scale to larger cluster systems, greater numbers of pending jobs, and higher average frequency of task requests.

Figure 2:
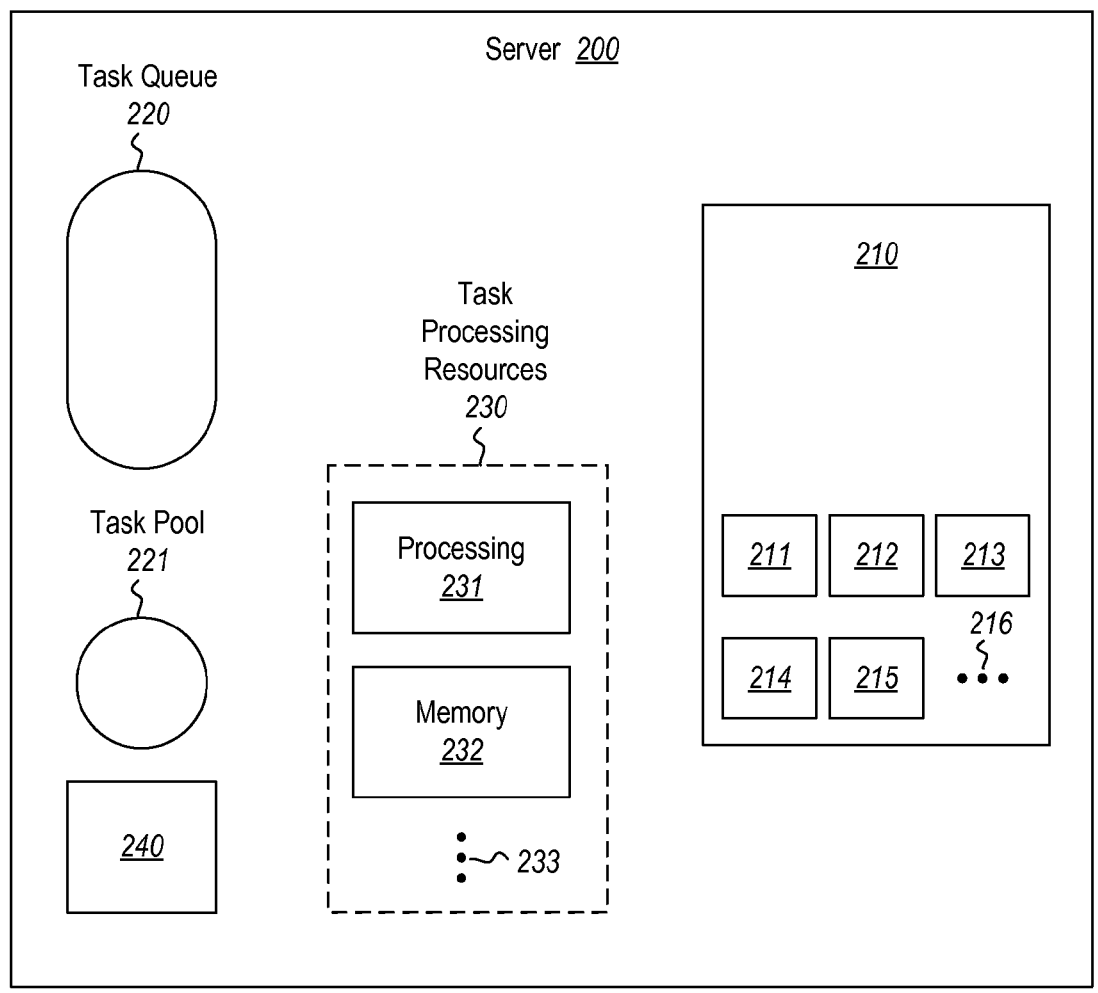
FIG. 2 abstractly illustrates a server that represent an example of any of the servers of FIG. 1.

FIG. 2 abstractly illustrates a server 200 that represent an example of any of the servers 130 of FIG. 1. The server 200 includes a server performance monitoring component 210, a task queue 220, a task pool 221, task processing resources 230, and an opportunistic scheduling module 240. The task queue 220 maintains a queue of tasks that are awaiting initiation on the server 200. The tasks are processed using the task processing resources 230. The operation of the task pool 221 and the opportunistic scheduler module 240 will be deferred to further below. However, the operation of the server performance monitoring component 210 will now be described in further detail.

The server performance monitoring component 210 maintains expected server performance information comprising expected performance parameters of tasks having varying characteristics if assigned to the server. In other words, the expected server performance information includes expected performance parameters for a number of task categories. In FIG. 2, for instance, the server performance monitoring component 210 is illustrated as tracking expected performance parameters for five task categories 211, 212, 213, 214 and 215. However, the ellipses 216 represents that there may be any number of task categories for which the server performance monitoring component 210 tracks expected server performance parameters for any number of task categories.

The task categories might be delineated by any variable that could affect estimated wait time before tasks of that category are started. For instance, the server 200 is illustrated as including task processing resources 230. The availability of such task processing resources 230 at any given point in time may of course affect how long it might take before tasks of particular types might have to wait before beginning execution. In general, tasks that require greater task processing resources 230 might have to wait longer before being initiated than tasks that require lesser task processing resources 230.

In FIG. 2, the task processing resources 230 are illustrated as including processing resources 231 (e.g., processor cores) and memory resources 232. However, the ellipses 233 represent that the task processing resources 230 might utilize other types of task processing resources (e.g., required bandwidth) that may affect when a task might be initiated.

In some embodiments, the expected performance parameter might also be influenced by the state of the task queue 220. For instance, the expected performance parameter might be an expected wait time until the task of that category is initiated. In that case, the server performance monitoring component 210 may be an expected wait time estimation module. That expected wait time will depend on the current state of the task queue 220. Accordingly, when generating an expected performance parameter (e.g., expected wait time) with respect to each of the task categories, the server performance monitoring component 210 may consider not only the resources used by tasks of that category, but also the current state of the task queue 220.

Figures 3, 4:
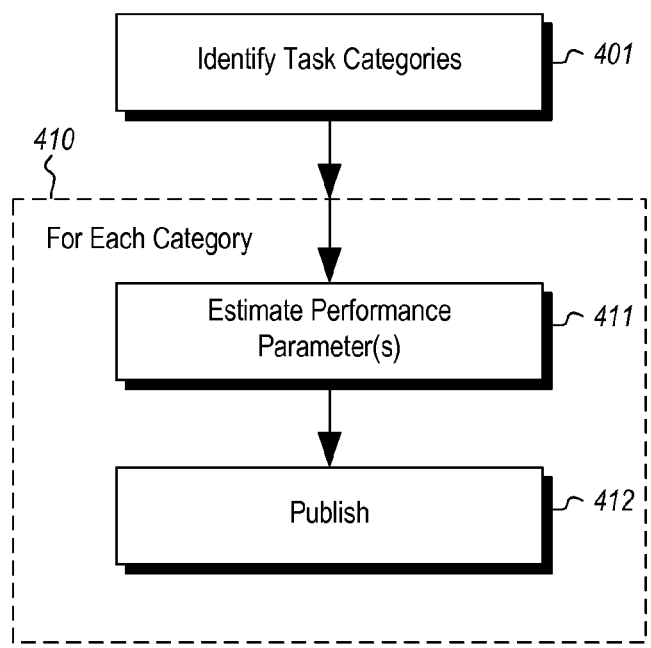
FIG. 3 illustrates a matrix that shows an example expected wait times matrix categorized by both processor cores and memory size.
FIG. 4 illustrates a flowchart of a method for the server performance monitoring component to formulate or assist in formulating the server performance matrix.

Thus, if the task categories were delineated by task processing resources 230 used to perform the task, the task categories might be, for example, delineated by the amount of processing resources (e.g., the number processing cores) and memory resources (e.g., in terms of size) that are to be used to perform tasks. For instance, FIG. 3 illustrates a wait time matrix 300 that shows the example expected wait times categorized by both processor cores and memory size. In this example matrix 300, for tasks that require only 4 Gigabytes (GB) of memory, and 2 or 4 processor cores, those tasks are estimated to have no wait time before they can be started by the server 131. In the matrix 300, the longest estimated wait time is 25 seconds for tasks using the maximum 16 GB of memory and the maximum of 8 processor cores. Of course, it will take a bit longer for the server to free up (through task completion and/or reassignment) 16 GB of memory and 8 processor cores than it would take for the server to free up 2 GB of memory and 2 processor cores. There might be a similar set of performance parameters (also referred to herein as a "server performance matrix") for each of the servers as their capabilities and current state will differ and change over time.

FIG. 4 illustrates a flowchart of a method 400 for the server performance monitoring component (such as the server performance monitoring component 210) to formulate or assist in formulating the server performance matrix. The method 400 includes identifying or defining task categories (act 401). This definition may be performed well in advance of the remainder of the method 400. For each task category, the method 400 includes the contents of dashed-lined box 410. Specifically, the server performance monitoring component estimates one or more performance parameters (e.g., estimated wait time) based on the state of the task queue (act 411) for the given task category. The server performance monitoring component also publishes the estimated performance parameters (act 412) to at least some of the job schedulers.

For instance, referring to FIG. 1, the servers 110 might each report their respective server performance matrix to each of the job schedulers 130 using the interface 142.

Alternatively, or in addition, the servers 110 might each report their respective server performance matrix to the cluster management component(s) 120 using the interface 143, after which the server performance matrices are reported to each of the job schedulers 130 over the interface 141. Either way, each of the job schedulers 130 has access to a relatively updated server performance matrix for each of the servers 110. In either case, the job schedulers 130 may be considered to have an interface for receiving expected server performance information directly or indirectly from the servers 110.

To keep the server performance matrix relatively fresh, the server performance monitoring component 210 of each server 110 may perform the content of dashed lined box 410 repeatedly. For instance, each server 110 might reevaluate (act 411) and republish (act 412) the server performance parameters for each task category periodically and/or in response to events. For instance, if the task queue for the server changes, that might be an event that warrants reevaluation and republishing. Other possible events might include the completion of a task, a detection of subpar performance of a task, an addition of a new task to the task queue, the removal of a task from the task queue, and the like.

Figure 5:
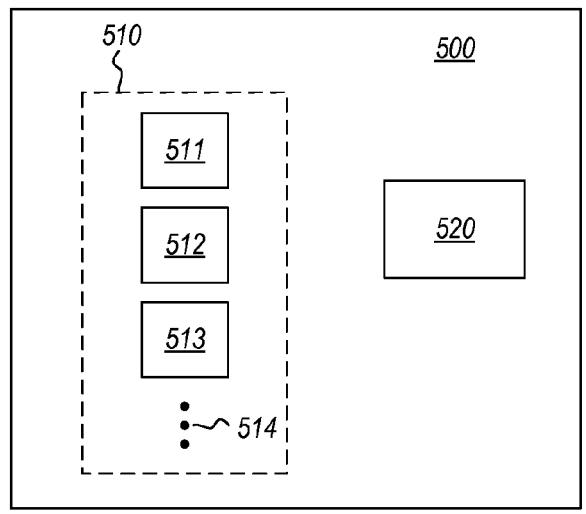
FIG. 5 illustrates a cluster management component that represent an example of any of the cluster management component(s) of FIG. 1.

FIG. 5 illustrates a cluster management component 500 that represent an example of any of the cluster management component(s) 120 of FIG. 1. The cluster management component 500 includes a collection 510 of server performance matrices. For instance, the collection 510 may include a server performance matrix for each of the servers 110 within the cluster system 100. As an example, the collection 510 includes server performance matrix 511 (corresponding to server 111), server performance matrix 512 (corresponding to server 112), and server performance matrix 513 (corresponding to server 113).

The server performance matrices 511 through 513 may have been provided by the corresponding servers 111 through 113 over the interface 143. Alternatively or in addition, the server performance matrices 511 through 513 may have been populated using information provided by the corresponding servers 111 through 113. The ellipses 514 represent that there may be additional server performance matrices corresponding to any further servers 110 (as represented in FIG. 1 by the ellipses 114). The use of cluster management component 500 as a clearinghouse for server performance information does help to scale the cluster system 100, since each server 110 is not responsible for reporting to each job scheduler 130, which reporting could become onerous as the number of servers 110 and job schedulers 130 increases. However, in alternative embodiments, the servers 110 report the server performance matrix to the job schedulers 130 directly.

The cluster management component 500 also includes cluster-level information 520 associated with the server cluster 100. Such cluster-level information could include any information that is not specific to any of the servers 110 or that is more efficiently monitored by the cluster management component 500, and that might have relevance to a decision regarding which server 110 a job scheduler 130 might pick to assign a given task. As an example, the cluster-level information 520 could include bandwidth information that couple nodes within a network. The cluster-level information 520 might also include information regarding scheduled maintenance, upgrade, addition, or removal of one or more servers within the cluster system 100. The cluster-information 520 might potentially include aggregated load information for at least some of the servers 110. Other examples of the cluster-level information will be described further below.

Returning to FIG. 1, the cluster management component(s) 120 may communicate such cluster-level information to each of the job schedulers 130 via the interface 141. Accordingly, each job scheduler 130 has access to both server-level information from each of the servers 110, as well as cluster-information from the cluster management component(s) 120. Accordingly, each job scheduler 130 may take into consideration both server-level information and cluster-level information, in deciding which server to assign a task to.

Figure 6:
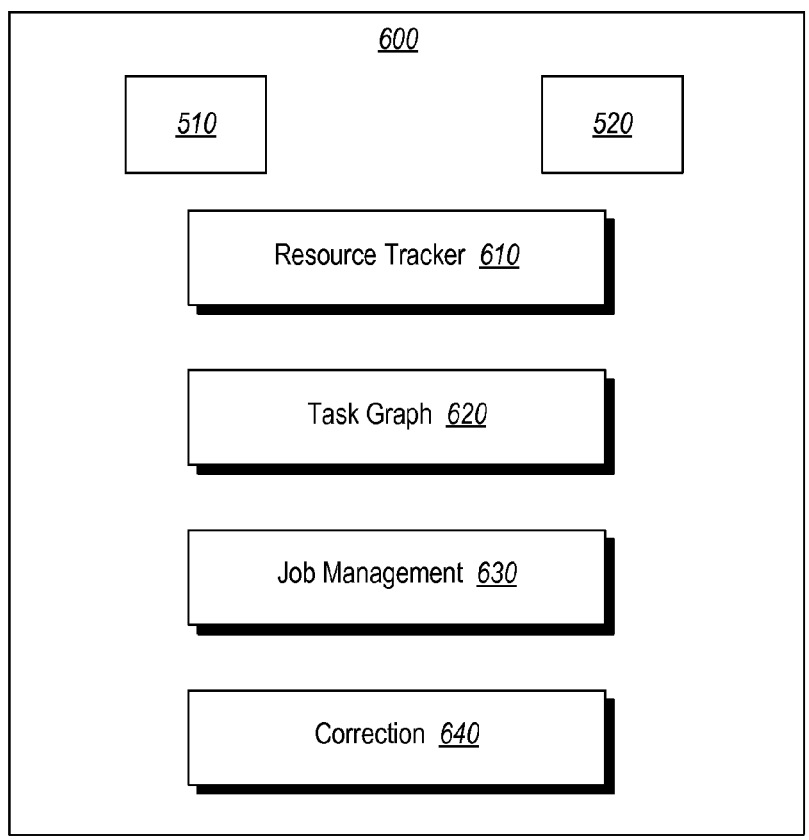
FIG. 6 illustrates a job scheduler that is an example of any of the job schedulers of FIG. 1.

FIG. 6 illustrates a job scheduler 600 that is an example of any of the job schedulers 130 of FIG. 1. As previously mentioned, the job scheduler has access to the server-level performance matrix for each of the servers 110. For instance, the job scheduler 600 has access to the collection 510 of server performance matrices previously communicated to the job scheduler 600 via the interfaces 141 or 142. The job scheduler 600 also has access to the cluster-level information 520 previously communicated to the job schedulers 600 via the interface 141. Recall that the collection 510 of server performance matrices and the cluster-level information 520 may be updated on a somewhat frequent basis.

The job scheduler 600 also includes a resource tracker 610, a task graph 620, a job management component 630 and a correction module 640. Recall that in one embodiment that scales particularly well, a single instance of a job scheduler 600 is dedicated for one job at a time. The resource tracker 610 identifies one or more locations of any input data to be processed by the job, as well as potentially one or more locations where output data is to be placed. The task graph 620 is a directed acyclic dependency graph of all of the tasks within the job. The job management component 630 schedules tasks of the job that are ready to be executed. The correction module 640 performs corrective action in the event that it appears that a task has not been optimally assigned to a server.

Figure 7:
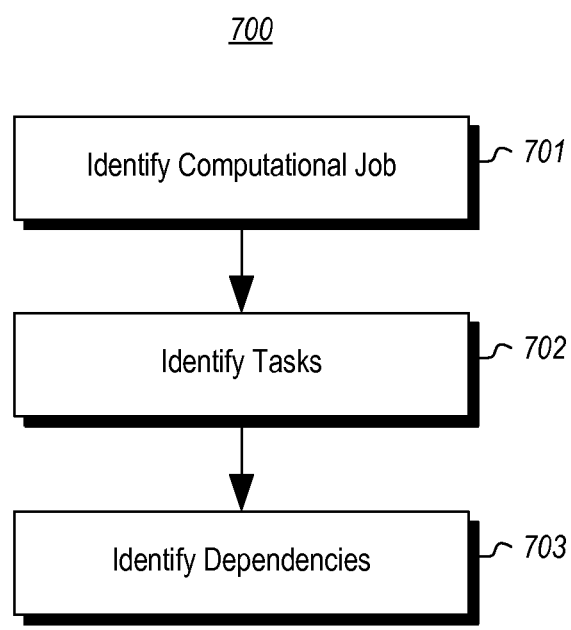
FIG. 7 illustrates a flowchart of a method for preparing for job scheduling.

FIG. 7 illustrates a flowchart of a method 700 for preparing for job scheduling. The method 700 may be performed by the job management component 630 or by the job scheduler 600 as a whole. Accordingly, the method 700 will be described with reference to the job scheduler 600 of FIG. 6.

Figure 8:
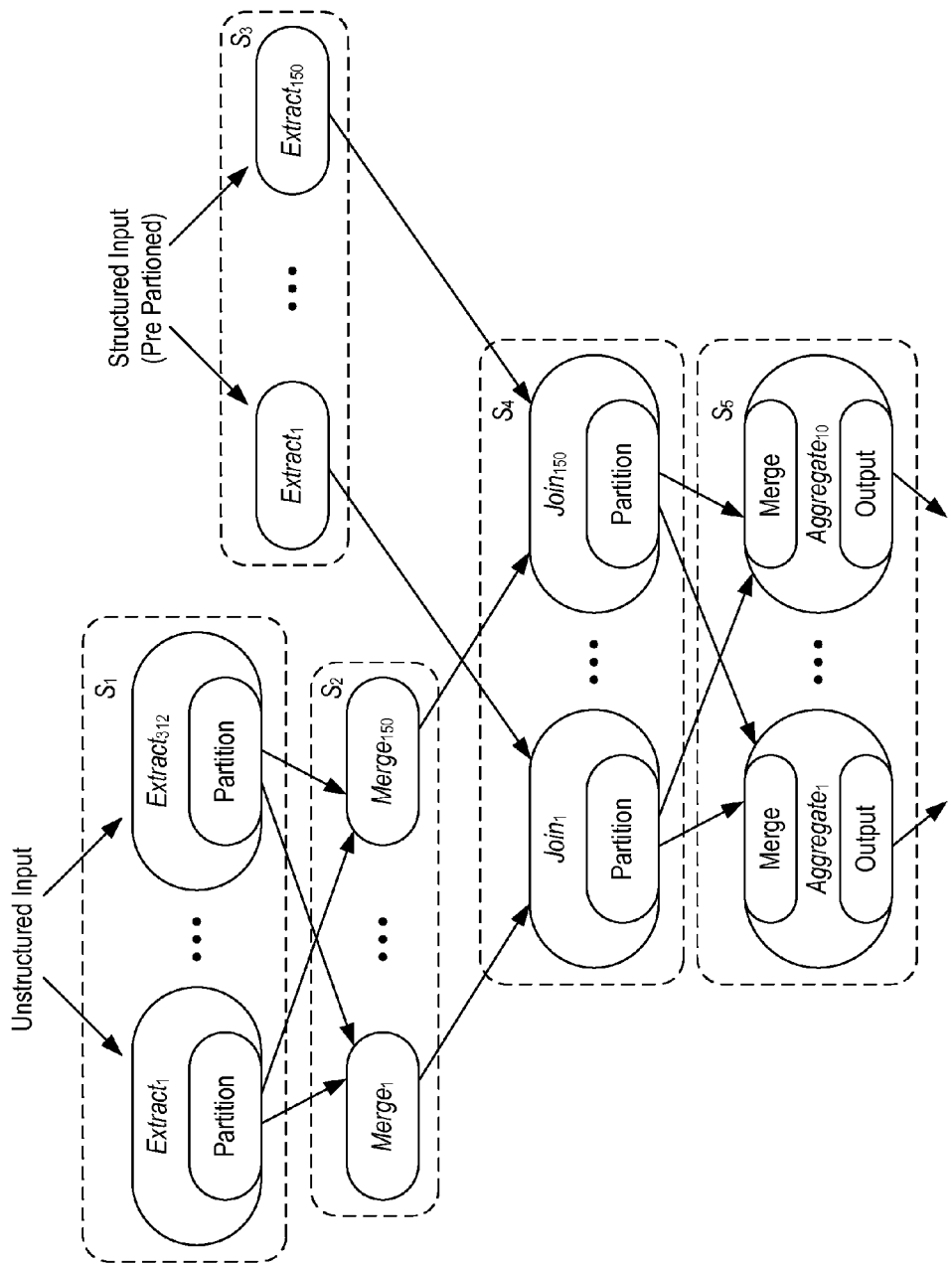
FIG. 8 illustrates a more specific example of a directed acyclic graph.

The method 700 is initiated upon identification of a computational job to be performed (act 701). Upon identifying the job to be performed, the job management component 630 identifies the tasks associated with the computational job (act 702). A task may be considered to be a basic unit of processing of a computational job. Furthermore, inter-task dependencies are identified (act 703). From this analysis, a directed acyclic graph in which each task represents a vertex in the graph, and each dependency represents an edge is formulated. That graph will also be referred to herein as a "task graph" or an "acyclic task graph". Mechanisms for formulating an acyclic task graph using a computation job as input are known in the art, and thus will not be described in further detail here. An example of the acyclic task graph is the acyclic task graph 620 of FIG. 6. FIG. 8 illustrates a more specific example of a directed acyclic task graph 800, which is represented using the SCOPE, a common authoring form for computational jobs. Note the high level of parallelism in the example of FIG. 8. Thus, when at the point of high parallelism, there will be numerous tasks ready to schedule.

Figure 9:
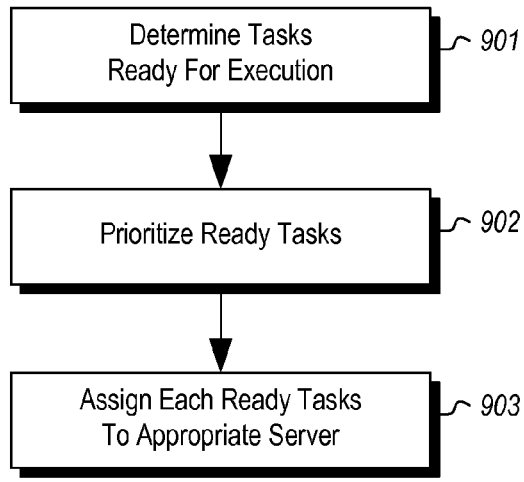
FIG. 9 illustrates a flowchart of a method that is performed repeatedly in order to progress job execution through the directed acyclic task graph.

FIG. 9 illustrates a flowchart of a method 900 that is performed repeatedly in order to progress job execution through the directed acyclic task graph. Accordingly, the method 900 is repeatedly performed after completing method 700 and using the resulting acyclic task graph as input. The method 900 again may be performed by the job management component 630 of FIG. 6, or more generally by the job scheduler 600 of FIG. 6. Accordingly, the method 800 will again be described with reference to the job scheduler 600 of FIG. 6. The job management component 630 repeatedly determines which of the tasks of the job are ready for execution based on the dependencies of the acyclic task graph (act 901). The job management component 630 prioritizes the ready jobs (act 902), and then assigns each ready task to an appropriate server (act 903).

Figure 10:
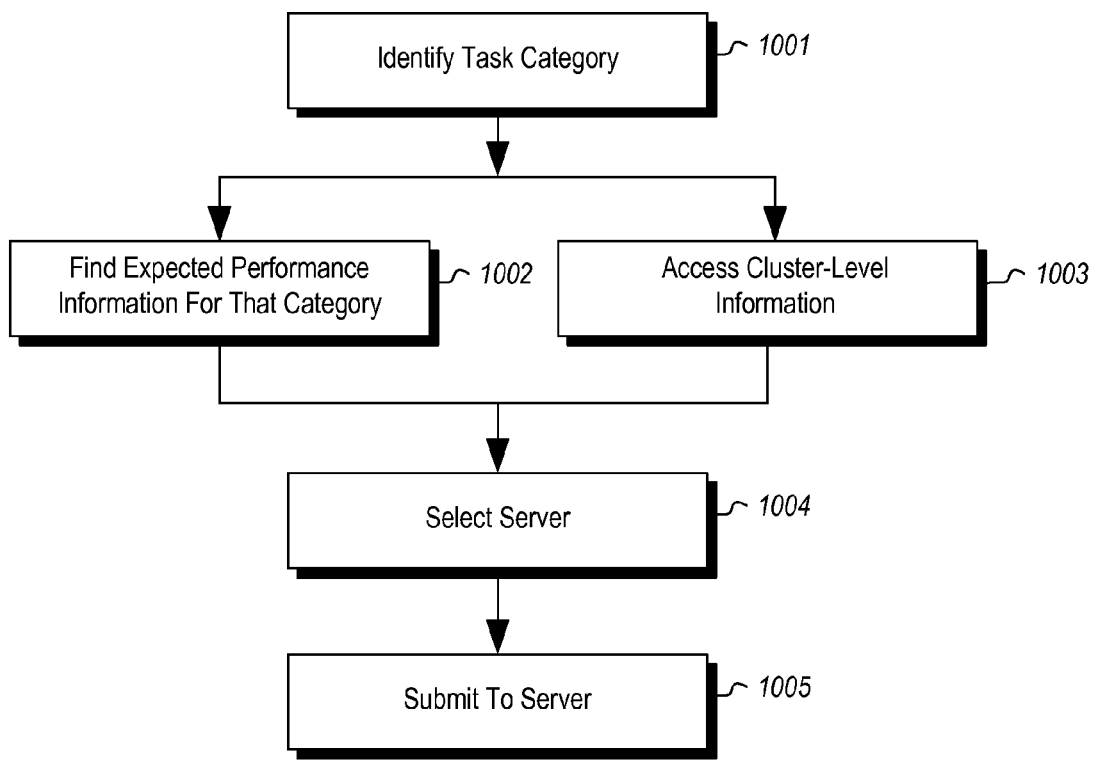
FIG. 10 illustrates a flowchart of a method for assigning a ready task to an appropriate server.

FIG. 10 illustrates a flowchart of a method 1000 for assigning a ready task to an appropriate server. The method 1000 represents an example of the act 903 of FIG. 9. Accordingly, again, method 1000 will be described with frequent reference to the job scheduler 600 of FIG. 6.

The job management component identifies a particular task category of the ready task (act 1001). For instance, this task category may correspond to one of the task categories for which the servers 110 have each published expected performance information. As an example, suppose that the task requires 1 processor core and 10 GB of memory. If the tasks are categorized as illustrated in FIG. 3, then the job management component 630 might determine that the task corresponds best to the task category requiring 2 processor cores and 12 GB of memory.

The job management component 630 then uses the collection 510 of server performance matrices and finds the expected server performance information for that task category for each of the servers 110 (act 1002). The job management component 630 also accesses the cluster-level information 520 (act 1003). Using this information (acquired in acts 1002 and 1003) the job management component 630 then selects an appropriate server (act 1004) from amongst the servers 110 to perform the task. The job management component 630 then submits the task assignment to the selected server (act 1005). As part of this notification, the job management component 630 may notify the selected server of the server resources to be used to perform the corresponding tasks.

Figure 11:
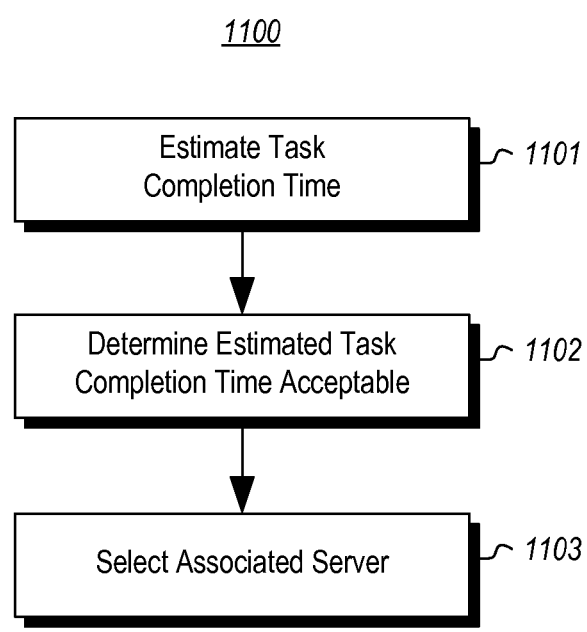
FIG. 11 illustrates a flowchart of a method for selecting an appropriate server to perform the task.

FIG. 11 illustrates a flowchart of a method 1100 for selecting an appropriate server to perform the task. The method 1100 is an example of the act 1004 of FIG. 10. The job management component 630 estimates a task completion time that the task would be completed by if performed by a particular server (act 1101). The job management component 630 then determines that the estimated task completion time associated with a particular server is acceptable (act 1102), and as a result, selects the particular server (act 1103). In some cases, the task completion time is estimated for each of multiple servers. In that case, the estimated completion time that is determined to be acceptable might be the earliest completion time estimated, and thus the particular server assigned to the task might be the server that is estimated to complete the task earliest. However, as will be descried hereinafter, that may not always be the case as the decision may be much more complex and involve a number of often competing considerations.

An embodiment of the estimation of the task completion time will now be described in much further detail. In this embodiment, when a job scheduler 130 schedules a task on a particular server (e.g., reference act 1005 of FIG. 10), the job scheduler 130 sends a task creation request with (i) resource requirement (CPU cores and memory), (ii) estimated runtime, and (iii) a list of files required to run the task (e.g., executables and configuration files).

The server 200 (e.g., the server performance monitoring component 210) receives the task creation request, and copies the files identified in the list of files in the task creation request. For instance, such might be accomplished by copying the files to a local directory using a peer-to-peer data transfer framework combined with a local cache.

The server performance monitoring component 210 monitors processor and memory usage of the server, considers the resource requirements of tasks in the task queue 220 at the server, and executes the task when the resource capacity is available. In server performance monitoring component 210 attempts to maximize resource utilization by executing as many tasks as possible, subject to the processor and memory requirements of individual tasks. The task queue 220 may be mostly First-In-First-Out (FIFO), but can be potentially be reordered. For example, a later task requiring a smaller amount of resources can fill a gap without affecting the expected start time of the others tasks.

The use of task queues within each server itself enables job schedulers 130 to dispatch tasks to the servers proactively based on future resource availability, instead of based on instantaneous availability. As described hereinbelow, the job scheduling framework considers estimated task wait time (the amount of time estimated for sufficient resources of that task category to be available) and other task characteristics in an attempt to optimize task scheduling. The use of task queues also masks task initialization cost by copying the files before execution capacity is available, thereby avoiding idle gaps between tasks. Thus, the servers, at least under some circumstances, may obtain one or more execution files needed to execute the task even before the particular task has been initiated, and while the task remains in the task queue.

Such a direct-dispatch mechanism provides efficiency and is especially helpful when there are small tasks, for which any protocol to negotiate incurs significant overhead. The server performance monitoring component 210 also provides feedback to the job scheduler 130 that submitted the task creation request to help improve accuracy of runtime estimation for this and future task requests. As described herein, runtime estimation is one factor in determining an estimated completion time for a task on a particular server.

For instance, runtime estimation might initially be conservative, based on the operators in a task and the amount of data to be processed. Tasks in the same stage given the acyclic graph perform the same computation over different datasets. Their runtime characteristics are similar and the statistics from the executions of the earlier tasks can help improve runtime estimates for the later ones. Once a task starts running, the server performance monitoring component 210 monitors its overall resource usage and responds to a corresponding job scheduler's status update requests with information such as memory usage, processor time, execution time (wall clock time), and I/O throughput. The scheduler then uses this information along with other factors such as operator characteristics and input size to refine resource usage and predict expected runtime for tasks from the same stage.

As mentioned above, the job scheduler 130 associated with a particular job decides which server to schedule a particular task to. In one embodiment described herein, this is performed using the task characteristics and a collection 510 that includes server performance matrices in the form of wait-time matrices. The job scheduler 130 considers a variety of (often conflicting) factors that affect the quality of scheduling decisions and does so in a single unified model using an estimation-based approach.

Figures 12A, 12B:
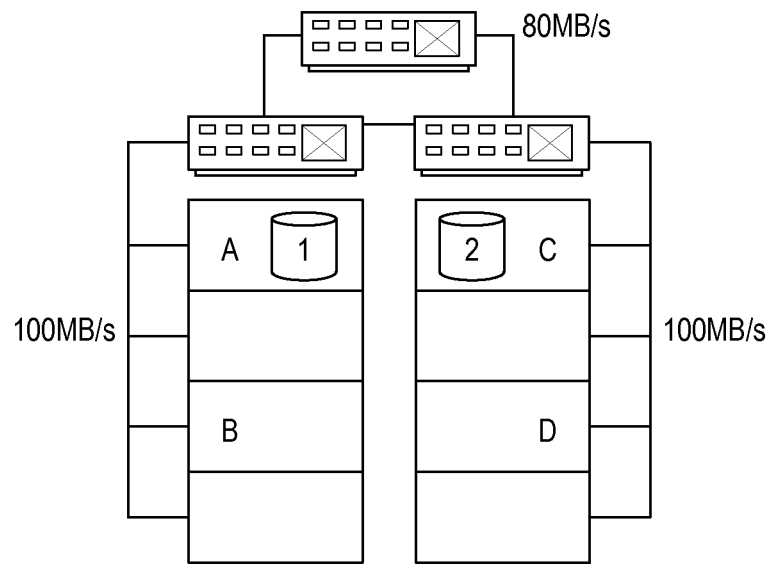
FIG. 12A illustrates an example that shows the importance of considering various factors all together, as well as the benefit of having a local queue on each server.
FIG. 12B shows the four scheduling choices, where servers A and B are immediately available, while server C has the best data locality, buy yet, server D is the optimal choice among those four choices if one is to proceed based on earliest estimated time of completion.

FIG. 12A illustrates an example that illustrates the importance of considering various factors all together, as well as the benefit of having a local queue on each server. FIG. 12A shows a simplified server map with two racks of servers. Each rack has four servers, connected via a hierarchically structured network. Assume in this example that data can be read from local disks at 160 MB/s, from within the same rack at 100 MB/s, and from a different rack at 80 MB/s.

For purposes of the example of FIG. 12A, consider a scenario in which a task having two inputs is being scheduled, the task runtime being dominated by I/O time. One of the inputs is 100 MB and is stored on server A. The other input is 5 GB and is stored on server C. FIG. 12B shows the four scheduling choices, where servers A and B are immediately available, while server C has the best data locality. Yet, server D is the optimal choice among those four choices if one is to proceed based on the earliest estimated time of completion. The job scheduler can recognize this only when considering data locality and wait time together.

This example also illustrates the value of local queues. Without a local task queues on each server, scheduling mechanisms that check for immediate resource availability would settle on the non-optimal choice of server A or B. The job scheduler thus considers various factors holistically and performs scheduling by estimating task completion time.

In one embodiment, in order to estimate task completion time, the task completion time if there is no failure (denoted by Esucc) is first calculated using the following equation 1:

$$E\text{succ} = I + W + R \quad (1)$$

The parameter "I" denotes the expected initialization time for fetching the execution files to be used to perform the task, which could be zero if those files are cached locally. The parameter "W" denotes the estimated expected wait time, and comes from a lookup in the wait-time matrix of the target server with the task resource requirement. The parameter "R" denotes an estimated task runtime for performing the task once the task is initiated, and consists of both input/output (I/O) time and processor run time (i.e., CPU time). The I/O time is computed as the input size divided by the expected I/O throughput. The input size might be determined with the assistance of the resource tracker 510. The expected I/O throughput might be determined using some of cluster-level information 520. The I/O could be from local memory, disks, or network at various bandwidths. Overall, estimation of R (estimated task runtime) might initially incorporate information from the job scheduler and later be refined with runtime statistics from the various servers that are performing the tasks in the same stage.

In a second phase, the estimated task completion time might factor in a probability of success of task completion. This probability of success might be estimated using the cluster-level information, which could include statistics for prior task runs on given servers. Accordingly, the estimated task completion time factors in the probability of task failure to calculate the final completion time estimate, denoted by C in accordance with the following Equation 2.

$$C = P\text{succ} \times E\text{succ} + K\text{fail} \times (1 - P\text{succ}) \times E\text{succ} \quad (2)$$

Hardware failures, maintenance, repairs, and software deployments are inevitable in a real large-scale environment. To mitigate their impact, the cluster management component(s) 120 gathers information on upcoming and past maintenance scheduled on every server. Together, a success probability Psucc is derived and considered to calculate C in equation 2. A penalty constant Kfail, which may be determined empirically, is used to model the cost of server failure on the completion time.

Besides completion time estimation, the task-execution order also matters for overall job latency. For example, for the job graph in FIG. 8, suppose the tasks in S1 run for 1 minute on average, the tasks in S2 run for an average of 2 minutes (with potential partition-skew induced stragglers) running up to 10 minutes, and the tasks in S3 run for an average of 30 seconds on average. As a result, efficiently executing S1 and S2 appears more critical to achieve the fastest runtime. Therefore, the job scheduler prioritizes resources to tasks within S1 and S2 before considering tasks within S3. Within S2, the scheduler should start the vertex with the largest input as early as possible, because it is the most likely to be on the critical path of the job.

A static task priority is annotated per stage by the job scheduler through analyzing the job directed acyclic graph (DAG) and calculating the potential critical path of the job execution. Tasks within a stage are prioritized based on the input size. The job scheduler may schedule tasks and allocates their resources in a descending order of their priorities. Since a job contains a finite number of tasks, the starvation of a task with low static priority is impossible, because eventually, if a task is not executed for a while, a task will be the only task left to execute, and will be executed.

For efficiency, the job scheduler may schedule tasks with similar priorities in batches and turn the problem of task scheduling into that of matching between tasks and servers. For each task, the job scheduler could search all the servers in a cluster for the best match. The matching approach becomes prohibitively expensive on a large cluster. Instead, the job scheduler may limit the search space for a task to a candidate set of servers, including (i) a set of servers on which inputs of significant sizes are located, (ii) a set of servers in the same rack as those from the first group (iii) two servers randomly picked from a set of lightly-loaded servers. The list of candidate server sets may be curated in the background.

Figure 13:
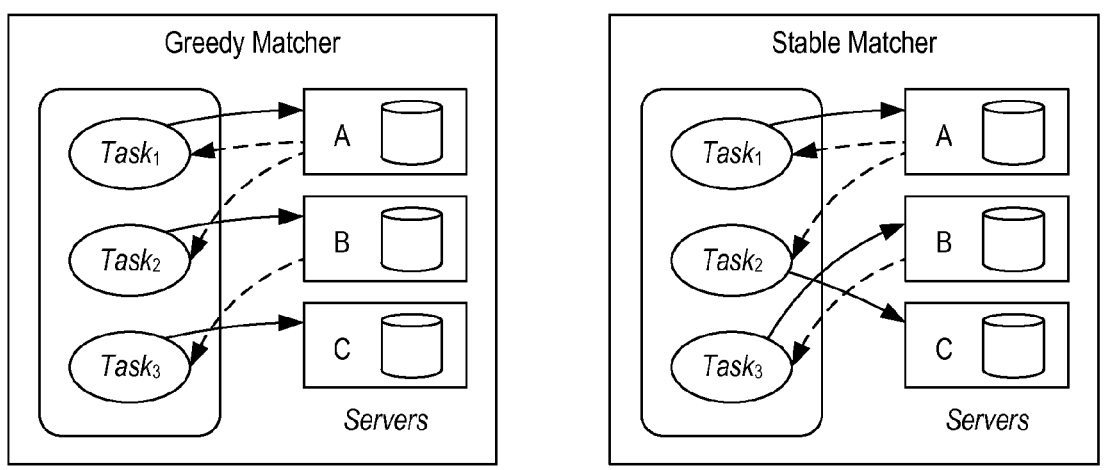
FIG. 13 shows an example with a batch of three tasks being scheduled.

A greedy algorithm can be applied for each task sequentially, choosing the server with the earliest estimated completion time at each step. However, the outcome of the greedy algorithm is sensitive to the order in which tasks are matched and often leads to suboptimal decisions. FIG. 13 shows an example with a batch of three tasks being scheduled. Assume both Task1 and Task2 read data from server A while Task3 reads from server B, as shown with dotted lines. Each server has capacity to start one task. As shown by the solid lines, the greedy matcher first matches Task1 to server A, then matches Task2 to server B because Task1 is already scheduled on A, and finally Task3 to server C, as shown with solid lines. A better match would have assigned Task3 to server B for better locality.

Therefore, the job scheduler may adopt a variant of a stable matching algorithm to match tasks with servers. For each task in a batch, the job scheduler finds the server with the earliest estimated completion time as a proposal for that task. A server accepts a proposal from a task if that is only proposal assigned. A conflict arises when more than one task proposes to the same server. In this case, the server picks the task whose completion time saving is the greatest if it is assigned to the server. The tasks not picked withdraw their proposals and enter the next iteration that tries to match the remaining tasks and servers. This iterates until all tasks have been assigned, or until it reaches the maximum number of iterations. As shown in FIG. 13, the variant of the matching matches Task2 to server C and Task3 to server B, which effectively leverages locality and results in better job performance.

The job scheduler then sorts all the matched pairs based on their quality to decide the dispatch order. A match is considered with a higher quality if its task has a lower server wait time. The job scheduler iterates over the sorted matches and dispatches in order until it is out of the allocated capacity. If opportunistic scheduling (described below) is employed, the job scheduler continues to dispatch the tasks until the opportunistic scheduling limit.

To simplify the matching algorithm for a tradeoff between efficiency and quality, the job scheduler might assigns only one task to each server in a single batch, because otherwise the job scheduler might update the wait-time matrix for a server to take into account the newly assigned task, which increases processing complexity. This simplification might lead to a suboptimal match for a task in a case where servers taking on a task in the same batch already remains a better choice. The job scheduler might mitigates the effect in two ways: if the suboptimal match is of a low quality, sorting the matches by quality will cause the dispatching of this task to be postponed, and later re-evaluated. Even if the suboptimal match is dispatched, the correction mechanisms described hereinafter will catch this case and reschedule the task if needed.

Each job manager might schedule tasks independently at a high frequency, with little or delay in the process. Thus, large numbers of small task might be efficiently handled. However, due to the distributed nature of the scheduling, several job schedulers might make competing decisions at the same time. In addition, the information used (such as wait-time matrices) for scheduling decisions might be stale; the task wait time and runtime might be under or overestimated. The job scheduler may have correction mechanisms (e.g., see correction module 640 of FIG. 6) to address those challenges and dynamically adjust scheduling decisions with new information.

The job scheduling infrastructure may optimistically defer any correction until after tasks are dispatched from the job scheduler to the server queues. Scheduling conflicts are not always harmful. Two tasks scheduled to the same server simultaneously by different job schedulers might be able to run concurrently if there are sufficient resources for both task. Alternatively, tasks that are previously scheduled on the server might complete soon, and thus normal operation might release sufficient resources early enough to make any conflict resolution unnecessary.

In those cases, a deferred correction mechanism, made possible with task queues present on the servers themselves, avoids the unnecessary overhead associated with eager conflict detection and resolution. Correction mechanisms continuously reevaluate the scheduling decisions with up-to-date information and make appropriate adjustments whenever necessary.

When a job scheduler gets fresh information (e.g., updated server performance matrices and/or updated cluster-level information) during task creation, task upgrade, or while the server monitors its queued tasks, the job scheduler compares the updated information (and the elapsed wait time so far) to the information that was used to make the scheduling decision. The job scheduler re-evaluates the decision if (i) the updated expected wait time is significantly higher than the originally calculated expected wait time; (ii) the expected wait time is greater than the average among the tasks in the same stage; and/or (iii) the elapsed wait time is already greater than the average. The first condition indicates an underestimated task completion time on the server, while the second and third conditions indicate a low matching quality. Any change in the decision triggers scheduling a duplicate task to a new desired server. Duplicate tasks are discarded when one task starts.

Multiple job schedulers might schedule tasks to the same lightly loaded server, not aware of each other, thereby leading to scheduling conflicts. The job scheduler may add a small random number to each completion time estimation. This random factor helps reduce the chances of conflicts by having different job schedulers choose different, almost equally desirable, servers. The range within which the random number is selected may be proportional to the communication interval between the job scheduler and the server, introducing no noticeable impact on the quality of the scheduling decisions.

The aggregated cluster-level information obtained from the cluster management component may contain wait-time matrices of different ages, some of matrices perhaps being stale can be stale. The job scheduler attributes a lower confidence to older wait-time matrices because it is likely that the wait time changed since the time the matrix was calculated. When the confidence in the wait-time matrix is low, the job scheduler may produce a pessimistic estimate by looking up the wait time of a task consuming more processor core and memory. Accordingly, the estimated completion time for a task may factor in confidence of the expected server performance information (e.g., the wait-time matrix) and may factor in the staleness of the expected server performance information.

Stragglers are tasks making progress at a slower rate than other tasks, and have a crippling impact on job performances. The job scheduler 130 may detect stragglers by monitoring the rate at which data is processed and the rate at which processing resources is consumed to predict the amount of time remaining for each task. Other tasks in the same stage are used as a baseline for comparison. When the time it would take to rerun a task is significantly less than the time it would take to let it complete, a duplicate task is started. The duplicate task and the original task will execute in parallel until the first one finishes, or until the duplicate task catches up with the original task. The job scheduler also monitors the rate of I/O and detects stragglers caused by slow intermediate inputs. When a task is slow because of abnormal I/O latencies, the job scheduler might rerun a copy of the upstream task to provide an alternate I/O path.

Besides achieving high quality scheduling at scale, the job scheduling infrastructure may also operate efficiently and drive high cluster utilization. Cluster utilization fluctuates over time for several reasons. First, not all users submit jobs at the same time to consume their allocated capacities fully. A typical example is that the cluster load on weekdays is almost always higher than on weekends. Second, jobs differ in their resource requirements. Even daily jobs with the same computation logic consume different amount of resources as their input data sizes vary. Finally, a complete job typically goes through multiple stages, with different levels of parallelism and varied resource requirements. Such load fluctuation on the system provides job schedulers with an opportunity to improve job performance by increasing utilization, at the cost of predictability. Utilization is increased since tasks can be opportunistically performed when resources are available. However, this very possibility makes it more difficult to predict expected wait time. Drawing the proper balance is challenging.

Opportunistic scheduling allows the scheduling framework to gracefully take advantage of idle server resources whenever they are available. This may be accomplished through the assignment of tokens to each job. Tasks can execute either in the regular mode, with sufficient tokens to cover its resource consumption, or in the opportunistic mode, without allocated resources. Each scheduler first applies optimistic scheduling to dispatch regular tasks with its allocated tokens. If all the tokens are utilized and there are still pending tasks to be scheduled, opportunistic scheduling may be applied to dispatch opportunistic tasks. Performance degradation of regular task is prevented by running opportunistic tasks at a lower priority at each server, and any opportunistic task can be preempted or terminated if the server is under resource pressure.

One immediate challenge is to prevent one job from consuming all the idle resources unfairly. The server may use randomized allocation to achieve probabilistic resource fairness for opportunistic tasks. In addition, the job scheduler may upgrade opportunistic tasks to regular ones when tokens become available and assigned.

The opportunistic resources should ideally be shared fairly among jobs, proportionally to jobs' token allocation. This is particularly challenging as both the overall cluster load and individual server load fluctuate over time, which makes it difficult, if not impossible, to guarantee absolute instantaneous fairness. Instead, the scheduling framework focusses on avoiding the worst case of a few jobs consuming all the available capacity of the cluster and target average fairness.

The scheduling framework achieves this by setting a maximum opportunistic allowance for a given job proportionally to its token allocation. For example, a job with n tokens can have up to c times n opportunistic tasks dispatched for some constant c. When a server has spare capacity and the regular queue is empty, the server's opportunistic scheduler 240 picks a random task from the opportunistic task pool 221, regardless of when the opportunistic task was dispatched. If the chosen task requires more resources than what is available, the randomized selection process continues until there is no more task that can execute. Compared to a FIFO queue, the algorithm has the benefit of allowing jobs that start later to get a share of the capacity quickly. If a FIFO queue were used for opportunistic tasks, it could take an arbitrary amount of time for a later task to make its way through the queue, offering unfair advantages to tasks that start earlier.

As the degree of parallelism for a job varies in its lifetime, the number of tasks that are ready to be scheduled also varies. As a result, a job may not always be able to dispatch enough opportunistic tasks to use its opportunistic allowance fully. The system may address this by allowing each job scheduler to increase the weight of an opportunistic task during random selection, to compensate for the reduction in the number of tasks. For example, a weight of 2 means a task has twice the probability to be picked. The total weight of all opportunistic tasks issued by the job must not exceed its opportunistic allowance.

Under an ideal workload, in which tasks run for the same amount of time and consume the same amount of resources, and in a perfectly balanced cluster, this strategy averages to sharing the opportunistic resources proportionally to the job allocation. However, in reality, tasks have large variations in runtime and resource requirements. The number of tasks dispatched per job change constantly as tasks complete and new tasks become ready. Further, jobs may not have enough parallelism at all times to use their opportunistic allowance fully. Designing a fully decentralized mechanism that maintains a strong fairness guarantee in a dynamic environment is challenging.

Opportunistic tasks are subject to starvation if the host server experiences resource pressure. Further, the opportunistic tasks can wait for an unbounded amount of time in the opportunistic task pool 221. In order to avoid job starvation, tasks scheduled opportunistically can be upgraded to regular tasks after being assigned a token. Because a job requires at least one token to run and there is a finite amount of tasks in a job, the scheduler is able to transition a starving opportunistic task to a regular task at one point, thus preventing job starvation.

After an opportunistic task is dispatched, the job scheduler tracks the task in its ready list until the task completes. When scheduling a regular task, the job scheduler considers both unscheduled tasks and previously scheduled opportunistic tasks that still wait for execution. Each job scheduler allocates its tokens to tasks and performs task matches in a descending order of their priorities. It is not required that an opportunistic task be upgraded on the same machine, but it might be preferable as there is no initialization time. By calculating all costs holistically, the scheduler favors upgrading opportunistic tasks on machines with fewer regular tasks, while waiting for temporarily heavily loaded machines to drain. This strategy results in a better utilization of the tokens and better load balancing.

Computing systems are important to the implementation of the principles described herein. For instance, each of the servers 110 might be a computing system. Furthermore, each job scheduler 130 and the cluster management component(s) 120 may each be either computing systems, or modules that run on computing systems. For instance, such modules might be operated and/or instantiated in response to one or more processors of the computing system running one or more computer-executable instructions that are embodied on one or more computer-readable storage media that form a computer program product that is accessed by the computing system. Accordingly, a general computing system will now be described.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 14:
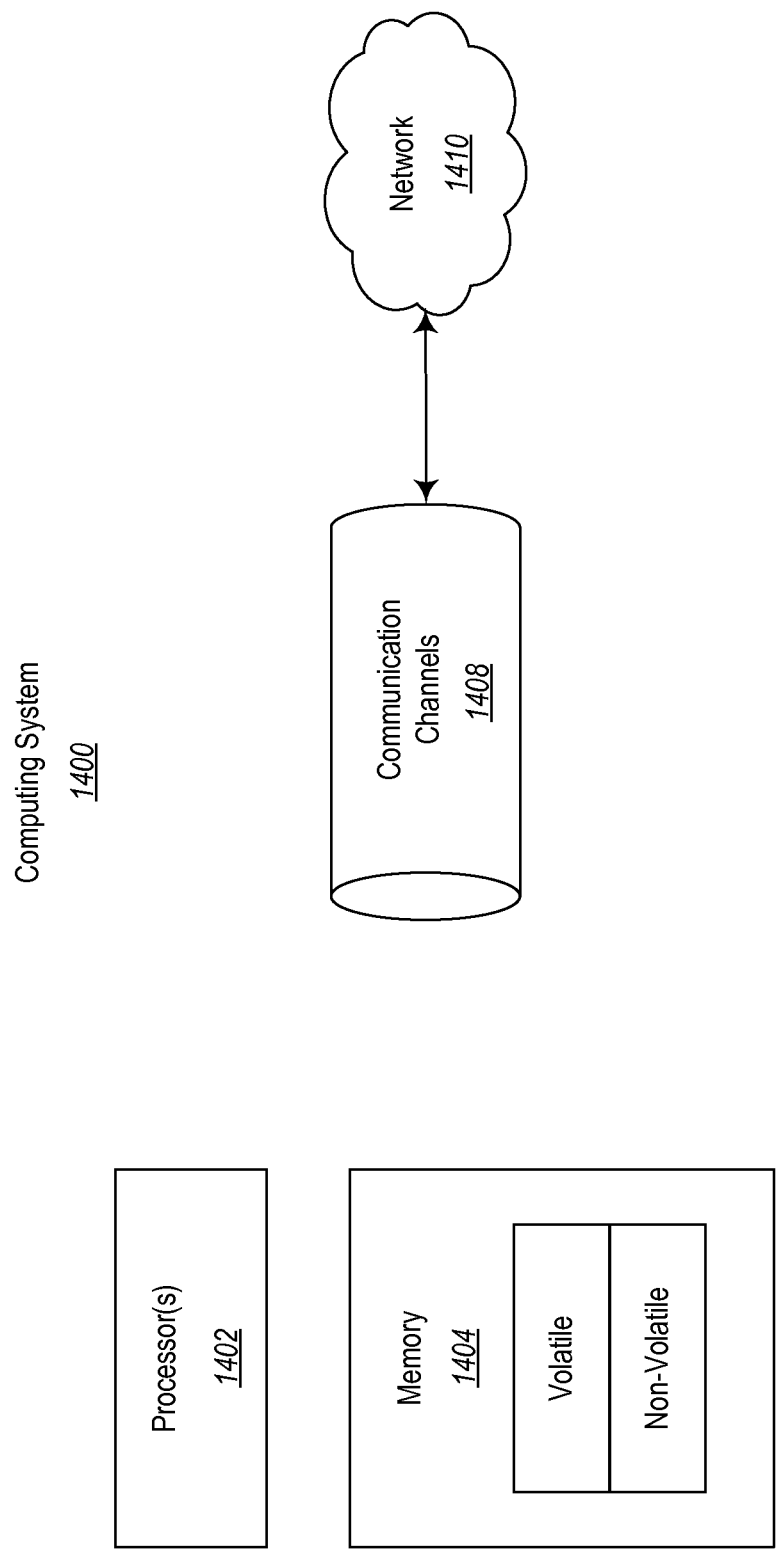
FIG. 14 illustrates an example computing system in which the principles described herein may be employed.

As illustrated in FIG. 14, in its most basic configuration, a computing system 1400 typically includes at least one processing unit 1402 and memory 1404. The memory 1404 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 1404 of the computing system 1400. Computing system 100 may also contain communication channels 108 that allow the computing system 1400 to communicate with other message processors over, for example, network 1410. The computing system 1400 may also have a display 1412 for displaying to a user.

Embodiments described herein may comprise or utilize a special-purpose or general-purpose computer system that includes computer hardware, such as, for example, one or more processors and system memory, as discussed in greater detail below. The system memory may be included within the overall memory 1404. The system memory may also be referred to as "main memory", and includes memory locations that are addressable by the at least one processing unit 1402 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed. Accordingly, an improved and highly scalable job scheduler is described. The following claim support section is to provide literal support for each of the original claims, and is the final section of the specification prior to the claims section.

CLAIM SUPPORT SECTION

In one embodiment, a computer program product comprises one or more computer-readable media having thereon computer-executable instructions that are structured such that, when executed by one or more processors of a computing system, cause the computing system to operating and/or instantiate a job scheduler that comprises the following: an interface for receiving expected server performance information from a plurality of servers, the expected server performance information for a given server comprising expected performance parameters for performance of tasks of each of a variety of task categories if assigned to the server, the interface also for receiving cluster-level information associated with a cluster of servers that include the plurality of servers; and a job management component that is configured to manage a job assignment associated with a computational job by identifying a plurality of tasks associated with the computational job, identifying task dependencies in performance of the plurality of tasks, determining which of the plurality of tasks are ready for execution based on the dependencies, and for each of at least some tasks that are ready for execution, performing the following: an act of identifying a particular task category of the corresponding task; an act of using the expected server performance information for the particular task category received through the interface, and using the cluster-level information received through the interface to select a server from amongst the plurality of servers to perform the corresponding task; and an act of submitting a request to perform the corresponding task to the selected server. In some embodiments, the job scheduler is configured to perform task scheduling for only one job at a time.

The expected performance parameters of tasks having varying characteristics if assigned to the server might include the following: for each of a plurality of task categories, an estimated wait time estimating how long before the corresponding server will be able to process tasks of the corresponding task category. For instance, the plurality of task categories might be categorized by server resources to be used to perform the corresponding tasks (in which case perhaps the request to perform the corresponding task includes notifying the selected server of the server resources to be used to perform the corresponding tasks). As examples only, the server resources by which the plurality of task categories are categorized might include server processing resources, and/or server memory resources.

The act of using expected server performance information and the cluster-level information to select the server could include the following: an act of estimating a task completion time that the job management component estimates the task could be completed by if performed by a particular server; an act of determining that the estimated task completion time associated with the particular server is acceptable; and an act of selecting the particular server as the server to perform the task. The act of determining that the estimated task completion time associated with the particular server is acceptable might include: for each of one or more other servers, an act of estimating a task completion time that the job management component estimates the task could be completed by if performed by the other corresponding server; and an act of determining that the estimated task completion time for the particular server is the least of the estimated completion times for the task. The act of estimating a task completion time that the job management component estimates the task could be completed by if performed by a particular server could factor in confidence of the expected server performance information. The act of estimating a task completion time that the job management component estimates the task could be completed by if performed by a particular server could factor in staleness of the expected server performance information. The estimated task completion time could also include an estimated wait time before the particular server is estimated to be available to initiate the task. The estimated task completion time could also factoring in a probability of success of task completion. The probability of success of task completion could be estimated by the job management component using the cluster-level information.

The estimated task completion time might also include an initialization time expected for the particular server to acquire execution files to be used to perform the task. The estimated task completion time might also include an estimated run time for performing the tasks by the particular server once the task is initiated. The estimated run time might also include processor run time and input/output (I/O) time. The job management component might estimate input/output time by using the cluster-level information.

The job scheduler further might include a task scheduling corrector configured to perform the following: an act of monitoring performance of a task by a particular server after the job management module requests that the particular server perform the task. The act of monitoring performance of a task by a server might comprise an act of receiving updates on server performance from the particular server. The task scheduling corrector might be configured to perform an act of taking corrective action if the task is not being performed as expected. The corrective action might include an act of assigning the task to a different server. The act of assigning the task to a different server might be performed without immediately deleting the task from the original server that was assigned the task. The job scheduling corrector further might be configured to delete the task from the different server after the task is initiated on the original server. The job scheduling corrector might be further configured to delete the task from the original server after the task is initiated on the different server.

The cluster-level information might comprise aggregated load information for at least some of the plurality of servers. The job management component might be configured to prioritize performance of tasks that are ready to be performed.

Embodiments described herein also include a cluster system comprising: a plurality of servers, each of at least some of which including an expected server performance monitoring component configured to maintain expected server performance information comprising expected performance parameters of tasks having varying characteristics if assigned to the server; a cluster management component configured to maintain cluster-level information; a plurality of job scheduler components, each of at least some of the plurality of job scheduler components comprising: an interface for receiving expected server performance information from the plurality of servers, the expected server performance information for a given server comprising expected performance parameters for performance of tasks of each of a variety of task categories if assigned to the given server, the interface also for receiving cluster-level information associated with a cluster of servers that include the plurality of servers; and a job management component that is configured to manage a job assignment associated with a computational job by identifying a plurality of tasks associated with the computational job, identifying task dependencies in performance of the plurality of tasks, determining which of the plurality of tasks are ready for execution based on the dependencies, and for each of at least some tasks that are ready for execution, performing the following: an act of identifying a particular task category of the corresponding task; an act of using expected server performance information for the particular task category received through the interface, and using the cluster-level information received through the interface to select a server from amongst the plurality of servers to perform the corresponding task; and an act of submitting a request to perform the task to the selected server.

Each of at least some of the at least some of the plurality of servers might have a task queue for queuing tasks scheduled to be performed by the corresponding server. With respect to a particular server having a particular queue, the particular server might be configured to, at least under some circumstances, obtain one or more execution files in preparation of a particular task in the particular queue even before the particular task has been initiated. A particular server of the plurality of servers might be configured to respond to multiple concurrent requests to schedule different tasks by scheduling both tasks. A particular server of the plurality of servers might be configured to respond to multiple concurrent requests to schedule different tasks by selecting whichever task results in the greatest savings of estimated completion time if selected. Each of at least some of the plurality of servers further might comprise: a task queue configured to queue tasks that are scheduled to be performed by one or more processing modules of the corresponding server; and a wait time estimation module configured to perform the following for each of a plurality of task categories: an act of estimating a wait time before which the task would be initiated by the one or more processing modules based on a state of the task queue; and an act of publishing the estimated wait time for at least some of the plurality of task categories to at least some of the plurality of job scheduler components. At least one of the wait time estimation modules might perform the acts of estimating and publishing repeatedly for successive states of the task queue. Each of at least some of the plurality of servers further might comprise: a task queue configured to queue tasks that are scheduled to be performed by the server; a task pool that is external to the task queue and that includes one more other tasks; and an opportunistic scheduling module that is configured to perform an act of assessing resource usage of the server, and if there are available resources to perform one or more of the tasks in the task pool, further performing an act of initiating the one or more tasks from the task pool.

Some embodiments described herein might be a method for a job management component to manage a job assignment associated with a computational job, the method comprising: an act of identifying a plurality of tasks associated with the computational job; an act of identifying task dependencies in the plurality of tasks;
an act of determining which of the plurality of tasks are ready for execution based on the task dependencies, for each of at least some tasks that are ready for execution, performing the following: an act of identifying a particular task category of the corresponding task; an act of receiving expected server performance information for the particular task category received through an interface; an act of receiving cluster-level information through an interface; an act of using the received expected server performance information for the particular task category and the received cluster-level information to select a server from amongst the plurality of servers to perform the corresponding task; and an act of submitting a request to perform the corresponding task to the selected server.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable memories storing computer-executable instructions which, when executed by one or more processors cause the one or more processors to perform a computer-implemented method that controls how a cluster system determines a particular server among a plurality of servers to which a job assignment associated with a computational job is to be given for execution, and wherein the computer-implemented method comprises acts of:

maintaining at each server expected server performance information comprising expected performance parameters of tasks having varying characteristics if assigned to the server, wherein the expected server performance information is based on tracking expected performance parameters for different categories of tasks;

maintaining cluster-level information that is not specific to any given server;

for a given computational job to be executed at the cluster system, identifying a plurality of tasks associated with the computational job;

for the given computational job, identifying task dependencies among the plurality of tasks;

for the given computational job, determining which of the plurality of tasks is ready for execution based on the task dependencies;

at a plurality of job schedulers, accessing cluster level information through an interface with a cluster management component, and accessing expected performance information regarding one or more server's capability to handle tasks for a particular category of tasks to which a task to be assigned belongs, the expected performance information being accessed by the plurality of job schedulers through either the interface with the cluster management component, or an interface with the plurality of servers;

for each task that is ready for execution, at least one of the plurality of job schedulers selecting which server to assign a task to based on (i) expected server performance information accessed by the plurality of job schedulers, and (ii) cluster level information accessed by the plurality of job schedulers; and submitting a request to the selected server to perform one or more of the tasks that are ready for execution.

2. The computer program product in accordance with claim 1, wherein selecting which server to assign a task to is performed for only one computational job at a time.

3. The computer program product in accordance with claim 1, wherein the expected performance parameters of tasks having varying characteristics if assigned to the server comprises:

for each of a plurality of task categories, an estimated wait time estimating how long before the corresponding server will be able to process tasks of the corresponding task category.

4. The computer program product in accordance with claim 3, wherein the plurality of task categories is categorized by server resources to be used to perform the corresponding tasks.

5. The computer program product in accordance with claim 4, wherein submitting a request to the selected server comprises notifying the selected server of the server resources to be used to perform the corresponding tasks.

6. The computer program product in accordance with claim 4, wherein the server resources by which the plurality of task categories are categorized comprises server processing resources.

7. The computer program product in accordance with claim 4, wherein the server resources by which the plurality of task categories are categorized comprises server memory resources.

8. The computer program product in accordance with claim 1, wherein selecting which server to assign a task to based on (i) expected server performance information received regarding a server's capability to handle tasks for a particular category of tasks to which the task to be assigned belongs, and (ii) cluster level information, comprises:
  estimating a task completion time that estimates the time by which the task could be completed by if performed by a particular server; and
  determining that the estimated task completion time associated with the particular server is acceptable.

9. The computer program product in accordance with claim 8, wherein determining that the estimated task completion time associated with the particular server is acceptable comprises:
  for each of one or more other servers, estimating a task completion time that estimates the time by which the task could be completed by if performed by the other corresponding server; and
  determining that the estimated task completion time for the particular server is the least of the estimated completion times for the task.

10. The computer program product in accordance with claim 8, wherein estimating a task completion time that estimates the time by which the task could be completed by if performed by a particular server comprises factoring in confidence of the expected server's performance information.

11. The computer program product in accordance with claim 10, wherein estimating a task completion time that estimates the time by which the task could be completed by if performed by a particular server comprises factoring in staleness of the expected server's performance information.

12. The computer program product in accordance with claim 8, wherein the estimated task completion time comprises an estimated wait time before the particular server is estimated to be available to initiate the task.

13. The computer program product in accordance with claim 12, wherein the estimated task completion time comprises factoring in a probability of success of task completion.

14. The computer program product in accordance with claim 13, wherein the probability of success of task completion is estimated by using the cluster-level information.

15. The computer program product in accordance with claim 12, wherein the estimated task completion time comprises an initialization time expected for the particular server to acquire execution files to be used to perform the task.

16. The computer program product in accordance with claim 12, wherein the estimated task completion time comprises an estimated run time for performing the tasks by the particular server once the task is initiated.

17. The computer program product in accordance with claim 16, wherein the estimated run time comprises processor run time and input/output (I/O) time.

18. The computer program product in accordance with claim 17, wherein input/output time is estimated by using the cluster-level information.

19. The computer program product in accordance with claim 1, wherein the computer-implemented method further comprises:
  monitoring performance of a task by a particular server after the particular server is requested to perform the task.

20. The computer program product in accordance with claim 19, wherein monitoring performance of a task by a particular server comprises receiving updates on server performance from the particular server.

21. The computer program product in accordance with claim 19, the computer-implemented method further comprises taking corrective action if the task is not being performed as expected.

22. The computer program product in accordance with claim 21, wherein the corrective action comprises assigning the task to a different server.

23. The computer program product in accordance with claim 22, wherein assigning the task to a different server is performed without immediately deleting the task from the particular server that was first assigned the task.

24. The computer program product in accordance with claim 23, wherein the task is deleted from the different server if the task is already initiated on the particular server that was first assigned the task.

25. The computer program product in accordance with claim 23, wherein the task is deleted from the particular server after the task is initiated on the different server.

26. The computer program product in accordance with claim 1, wherein the cluster-level information comprises aggregated load information for at least some of the plurality of servers.

27. The computer program product in accordance with claim 1, wherein the computer-implemented method comprises prioritizing performance of tasks that are ready to be performed before assigning any of the tasks to a particular server.

28. A computer-implemented method that controls how a cluster system determines a particular server among a plurality of servers to which a job assignment associated with a computational job is to be given for execution, the computer-implemented method being performed by one or more processors executing computer executable instructions for the computer-implemented method, and the computer-implemented method comprising acts of:
  maintaining at each server expected server performance information comprising expected performance parameters of tasks having varying characteristics if assigned to the server, wherein the expected server performance information is based on tracking expected performance parameters for different categories of tasks;
  maintaining cluster-level information that is not specific to any given server;
  for a given computational job to be executed at the cluster system, identifying a plurality of tasks associated with the computational job;
  for the given computational job, identifying task dependencies among the plurality of tasks;
  for the given computational job, determining which of the plurality of tasks are ready for execution based on the task dependencies;
  at a plurality of job schedulers, accessing cluster level information through an interface with a cluster management component, and accessing expected performance information regarding one or more server's capability to handle tasks for a particular category of tasks to which a task to be assigned belongs, the expected performance information being accessed by the plurality of job schedulers through either the interface with the cluster management component, or an interface with the plurality of servers;

for each task that is ready for execution, at least one of the plurality of job schedulers selecting which server to assign a task to based on (i) expected server performance information accessed by the plurality of job schedulers, and (ii) cluster level information accessed by the plurality of job schedulers; and submitting a request to the selected server to perform one or more of the tasks that are ready for execution.

29. A cluster system comprising:

a plurality of servers each comprising a memory device containing computer-executable instructions, and one or more processors which, when executing the computer executable instructions, cause a respective server to be configured with a server architecture comprising:
  a server performance monitoring component that maintains expected server performance information comprising expected performance parameters of tasks having varying characteristics if assigned to the server, wherein the expected server performance information is based on tracking expected performance parameters for different categories of tasks, and wherein the server performance monitoring component communicates the expected server performance information through one or both of a first interface with a cluster management component and a second interface with a job scheduler component;
  a task processing resources component that identifies processor resources and memory resources available for processing tasks; and
  a task queue that maintains a queue of tasks awaiting initiation on a respective server, wherein the task queue enables dispatch of tasks to be performed by the respective server based on future resource availability of the processor resources and memory resources identified by the task processing resources component, instead of based on instantaneous availability resources;

one or more memory devices for the cluster system, the one or more memory devices comprising computer executable instructions; and one or more processors for the cluster system, and wherein when the one or more processors of the cluster system execute the computer executable instructions of the one or more memory devices for the cluster system, a cluster architecture is instantiated that comprises:
  a cluster management component that maintains cluster-level information that is not specific to any given server; and
  a plurality of job scheduler components, and wherein:
    each job scheduler component receives the expected server performance information through one or the other of the following:
      the second interface through which expected server performance information is communicated from a given server's performance monitoring component; and
      a third interface through which expected server performance information is communicated from the cluster management component to the job scheduler component, and wherein the expected server performance information was received by the cluster management component from a given server's expected performance monitoring component through the first interface; and
    wherein for each task to be assigned, a given job scheduler component determines which server to assign a task to based on (i) expected server performance information received regarding a server's capability to handle tasks for a particular category of tasks to which the task to be assigned belongs, and (ii) cluster level information.

30. The system in accordance with claim 29, wherein one or more execution files are received in preparation of a particular task in the task queue of a given server before the particular task has been initiated.

31. The system in accordance with claim 29, wherein a at least one of the plurality of servers responds to concurrent requests to schedule two different tasks by scheduling both tasks.

32. The system in accordance with claim 29, wherein at least one of the plurality of servers responds to concurrent requests to schedule two different tasks by selecting whichever task results in the greatest savings of estimated completion time if selected.

33. The system in accordance with claim 29, wherein the expected performance parameters of tasks having varying characteristics if assigned to the server comprises a server performance matrix comprised of expected wait times for various combinations of processing resources and memory resources.

34. The system in accordance with claim 33, wherein the server performance matrix is periodically updated and is published each time the server performance matrix is updated by communicating the server performance matrix to at least one of the cluster management component and the job scheduler component.

35. The system in accordance with claim 29, wherein the server architecture further comprises:
  a task pool that is external to the task queue and that includes one more other tasks; and
  an opportunistic scheduling module that assesses resource usage of the server, and if there are available resources to perform one or more of the tasks in the task pool, initiating the one or more tasks from the task pool.

36. A computer-implemented method that controls how a cluster system determines a particular server among a plurality of servers to which a job assignment associated with a computational job is to be given for execution, the computer-implemented method being performed by one or more processors executing computer executable instructions for the computer-implemented method, and the computer-implemented method comprising:
  for each of a plurality of servers, maintaining expected server performance information comprising expected performance parameters of tasks having varying characteristics if assigned to the server, wherein the expected server performance information is based on tracking expected performance parameters for different categories of tasks;
  communicating the expected server performance information for each server through one or both of a first interface with a cluster management component and a second interface with a job scheduler component;
  identifying at each server processor resources and memory resources available for processing tasks;

maintaining at each server a queue of tasks awaiting initiation on a respective server, wherein the task queue enables dispatch of tasks to be performed by the respective server based on future resource availability of the processor resources and memory resources, instead of based on instantaneous availability of resources;

maintaining cluster-level information that is not specific to any given server; and for each of a plurality of job scheduler components, performing the following:
  receiving the expected server performance information through one or the other of the following:
    the second interface through which expected server performance information is communicated from a given server; and
    a third interface through which expected server performance information is communicated from a cluster management component, and wherein the expected server performance information was received by the cluster management component from a given server through the first interface; and
  wherein for each task to be assigned, a given job scheduler component determining which server to assign a task to based on (i) expected server performance information received regarding a server's capability to handle tasks for a particular category of tasks to which the task to be assigned belongs, and (ii) cluster level information.

* * * * *